United States Patent
Kuo et al.

(10) Patent No.: US 8,880,386 B2
(45) Date of Patent: Nov. 4, 2014

(54) METHOD FOR CIRCUIT SIMULATION

(75) Inventors: An-Yu Kuo, San Jose, CA (US); Xin Al, Los Gatos, CA (US)

(73) Assignee: Sigrity, Inc., Campbell, CA (US)

( * ) Notice: Subject to any disclaimer, the term of this patent is extended or adjusted under 35 U.S.C. 154(b) by 256 days.

(21) Appl. No.: 13/158,718

(22) Filed: Jun. 13, 2011

(65) Prior Publication Data

US 2012/0316857 A1 Dec. 13, 2012

(51) Int. Cl.
*G06F 17/50* (2006.01)

(52) U.S. Cl.
CPC ........ *G06F 17/5036* (2013.01); *G06F 2217/80* (2013.01)
USPC .............................. 703/14; 716/106; 716/111

(58) Field of Classification Search
CPC ............ G06F 17/5036; G06F 17/5018; G06F 17/5009; G06F 17/5022; G06F 2217/78; G01K 7/425; G01K 7/427; H03H 11/54
USPC .......................................................... 703/14
See application file for complete search history.

(56) References Cited

U.S. PATENT DOCUMENTS

| | | | |
|---|---|---|---|
| 7,366,997 B1 * | 4/2008 | Rahmat et al. | 716/111 |
| 7,472,363 B1 * | 12/2008 | Chandra | 716/106 |
| 7,480,874 B2 * | 1/2009 | Banoo et al. | 716/112 |
| 7,823,102 B2 * | 10/2010 | Chandra et al. | 716/106 |
| 8,019,580 B1 * | 9/2011 | Chandra et al. | 703/6 |
| 8,103,996 B2 * | 1/2012 | Kariat et al. | 716/100 |
| 8,527,918 B2 * | 9/2013 | Cheng et al. | 716/55 |
| 8,539,408 B1 * | 9/2013 | Cheng et al. | 716/110 |
| 2009/0319965 A1 * | 12/2009 | Kariat et al. | 716/4 |
| 2012/0053913 A1 * | 3/2012 | Xie et al. | 703/2 |

OTHER PUBLICATIONS

Petrosjanc et al, "Electro-Thermal Simulation: A New Subsystem in Mentor Graphics IC Design Flow", Therminic, Oct. 7-9, 2009.*
Xie et al, "Simulation of Power Delivery Networks with Joule Heating Effects of 3D Integration", Electronic System-Integration Technology Conference (ESTC), Sep. 13-16, 2010.*
Vellvehi et al, "Coupled Electro-Thermal Simulation of DC/DC Converter", Microelectronics Reliability, 47, pp. 2114-2121, 2007.*
Sokolowska et al, "TED Termo Electrical Designer: a New Physical Design Verification Tool", Proceedings of the 6th International Symposium on Quality Electronic Design, 2005.*

* cited by examiner

*Primary Examiner* — Mary C Jacob
(74) *Attorney, Agent, or Firm* — Kenyon & Kenyon LLP

(57) ABSTRACT

A computer-implemented method for simulating an electrical circuit. The method includes (a) setting a first temperature distribution in the electrical circuit, (b) performing an electrical simulation across the electrical circuit taking into consideration the first temperature distribution, (c) performing a thermal simulation across the electrical circuit taking into consideration a result of the electrical simulation, to obtain a second temperature distribution, and (d) determining whether a criterion for termination the simulation is met. If the criterion is met, terminate the simulation. If the criterion is not met, assign the second temperature distribution to the first temperature distribution, and repeat steps (b), (c), and (d).

26 Claims, 5 Drawing Sheets

METHOD FOR CIRCUIT SIMULATION

TECHNOLOGY FIELD

The present disclosure relates to circuit simulation and, more particularly, to circuit simulation taking into consideration both electrical and thermal characteristics of the circuit.

BACKGROUND

An electrical circuit may include hundreds of, or even more components, devices, modules, dies, etc., connected by metal traces, vias, solder bumps, etc. With the increasing scale of the electrical circuit, and the increasing complexity, it is very difficult, or even impossible, to completely rely on a human being to design an electrical circuit or to build a "test" circuit before an actual circuit is put into mass production. Circuit simulation based on computer-aided design has become an important tool for electrical circuit designers.

The behavior of an electrical circuit may depend on various parameters and may comprise multiple variables. Often time, the simulation may need to be "simplified," focusing on some of the parameters and variables. Traditional circuit simulation methods usually pay much attention to the models describing the distributions of electric current density and electric potential. In such models, many other parameters, such as temperature, are set with a constant value.

The traditional circuit simulation methods as described above may provide acceptable results for older generations of circuits where, for example, the circuit density is not large and the operation frequency is not high. For such circuits, the design margin is large enough to absorb the deficiencies caused by an inaccurate design. However, with the development of integrated circuit technology, the circuit density and the data rate of a circuit have increased, the data transition time has reduced, and the voltage and timing margins have also been reduced. Due to the shrinking in the design margin, more accurate design is needed.

Generally, temperature is one of the parameters that can affect the performance of the electrical circuit. For example, the resistance of the traces in the circuit may be temperature dependent. There is a need for a circuit simulation method and apparatus that takes into consideration both the electric and thermal characteristics of an electrical circuit.

SUMMARY

In accordance with the present disclosure, a computer-implemented method for simulating temperature and electrical property in an electrical circuit is provided. The method includes (a) setting a first temperature distribution in the electrical circuit, (b) performing an electrical simulation across the electrical circuit taking into consideration the first temperature distribution, (c) performing a thermal simulation across the electrical circuit taking into consideration a result of the electrical simulation, to obtain a second temperature distribution, and (d) determining whether a criterion for terminating the simulation is met. If the criterion is met, terminate the simulation. If the criterion is not met, assign the second temperature distribution to the first temperature distribution, and repeat steps (b), (c), and (d).

Also in accordance with the present disclosure, a computer-implemented method for simulating temperature and electrical property in an electrical circuit is provided. The method includes (a) setting a first temperature distribution in the electrical circuit, (b) performing a first electrical simulation across the electrical circuit taking into consideration the first temperature distribution, to obtain a first electrical property, (c) performing a thermal simulation across the electrical circuit taking into consideration the first electrical property, to obtain a second temperature distribution, (d) performing a second electrical simulation across the electrical circuit taking into consideration the second temperature distribution, to obtain a second electrical property, (e) calculating a difference between the first electrical property and the second electrical property, and (f) comparing the difference with a preset difference to determine whether a criterion for terminating the simulation is met. If the difference is smaller than or equal to the preset difference, it is determined that the criterion is met, and the simulation is terminated. If the difference is larger than the preset difference, it is determined that the criterion is not met, the second electrical property is assigned to the first electrical property, and steps (c)-(f) are repeated.

Also in accordance with the present disclosure, a computer-implemented method for simulating temperature and electrical property in an electrical circuit is provided. The method includes (a) setting a first temperature distribution in the electrical circuit, (b) performing a first electrical simulation across the electrical circuit, (c) performing a first thermal simulation across the electrical circuit to obtain a second temperature distribution, taking into consideration a result of the first electrical simulation, and (d) determining whether a criterion for terminating the simulation is met. If the criterion is met, terminate the simulation. If the criterion is not met, the method further includes (f1) performing a second electrical simulation across the electrical circuit, taking into consideration the second temperature distribution, (f2) performing a second thermal simulation across the electrical circuit to obtain a third temperature distribution, taking into consideration a result of the second electrical simulation in step (f1), and (f3) determining whether the criterion for terminating the simulation is met. If the criterion is met, terminate the simulation. If the criterion is not met, assign the third temperature distribution to the second temperature distribution, and repeat steps (f1), (f2), and (f3).

Also in accordance with the present disclosure, a computer-readable non-transitory storage medium storing a computer program is provided. The computer program, when executed, instructs a computer to (a) set a first temperature distribution in the electrical circuit, (b) perform an electrical simulation across the electrical circuit taking into consideration the first temperature distribution, (c) perform a thermal simulation across the electrical circuit to taking into consideration a result of the electrical simulation, to obtain a second temperature distribution, and (d) determine whether a criterion for terminating the simulation is met. If the criterion is met, the computer program instructs the computer to terminate the simulation. If the criterion is not met, the computer program instructs the computer to assign the second temperature distribution to the first temperature distribution, and to repeat steps (b), (c), and (d).

Features and advantages consistent with the present disclosure will be set forth in part in the description which follows, and in part will be obvious from the description, or may be learned by practice of the present disclosure. Such features and advantages will be realized and attained by means of the elements and combinations particularly pointed out in the appended claims.

It should be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Embodiments consistent with the present disclosure include a method for an electrical-thermal co-simulation of an electrical circuit, a computer program instructing a computer to perform the method, and a storage medium storing the program.

Hereinafter, embodiments consistent with the present disclosure will be described with reference to drawings. Wherever possible, the same reference numbers will be used throughout the drawings to refer to the same or like parts, or the same or like steps.

As will be discussed in more detail below, the simulation methods consistent with embodiments of the present disclosure include an electrical-thermal co-simulation taking into account both the electrical and thermal characteristics of the electrical circuit. Consistent with embodiments of the present disclosure, the electrical circuit may be formed as a part of an electrical package, such as a component-level package or a chip-level package, or a part of a circuit board, such as a printed-circuit-board (PCB). The electrical package or the circuit board may include materials forming the electrical circuit such as semiconductor and metal materials, as well as materials forming, for example, a substrate supporting the electrical circuit or an enclosure containing the electrical circuit, such as dielectric materials. In some embodiments, the electrical simulation may be performed only across the electrical circuit but the thermal simulation may be performed across the entire electrical package or PCB including the electrical circuit.

Figure 1A:
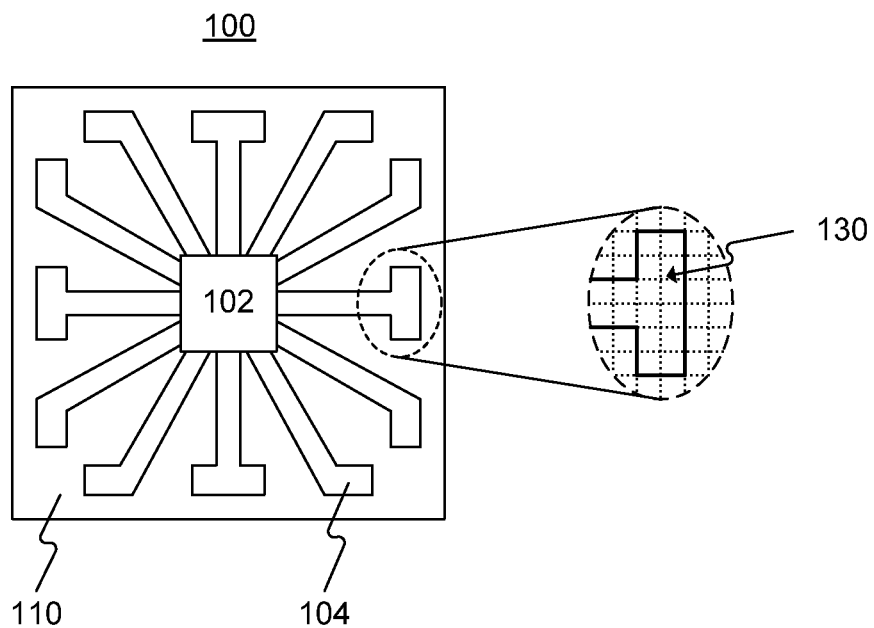
FIGS. 1(a) and 1(b) are plan view and cross-sectional view of an electrical package consistent with embodiments of the present disclosure.
Figure 1B:
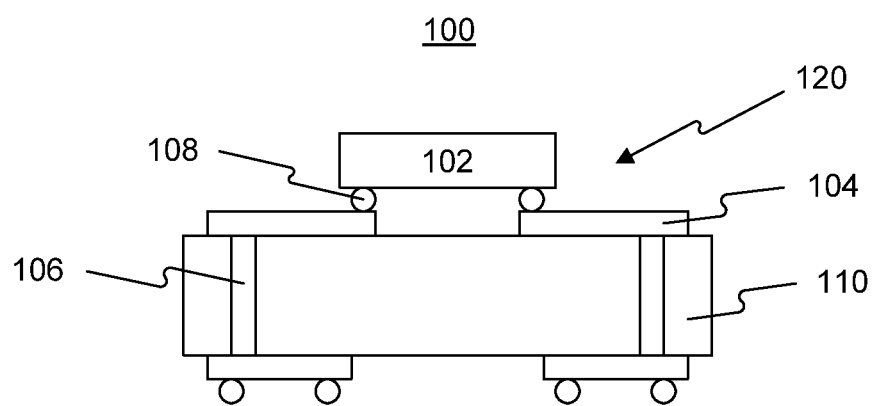

FIGS. 1(a) and 1(b) schematically show an exemplary electrical package 100 consistent with embodiments of the present disclosure. A person skilled in the art should appreciate that the disclosed method can be used to simulate much complicated circuit including multiple components. FIG. 1(a) is a plan view and FIG. 1(b) is a cross-sectional view. The electrical package 100 includes a die 102, traces 104, vias 106, and solder bumps 108 forming an electrical circuit 120. The electrical package 100 also includes a dielectric substrate 110, which serves as a support for the electrical circuit 120.

The simulations consistent with embodiments of the present disclosure may be numerical simulations. When performing the numerical simulations, a plurality of points on the electrical package 100 (and some of them are on the electrical circuit 120) may be chosen for performing the numerical simulations. For example, points 130 at the intersections of the horizontal dotted lines and vertical dotted lines in the enlarged view in FIG. 1(a) may be chosen. The distances between neighboring points may be the same or different. The simulations may be performed by establishing a numerical model, and then solving the numerical model for the values of parameters, such as temperature, electric current density, or electric potential, for the plurality of points. A model for the die 102 may be provided by a supplier or a user, and incorporated into the numerical model.

Figure 2:
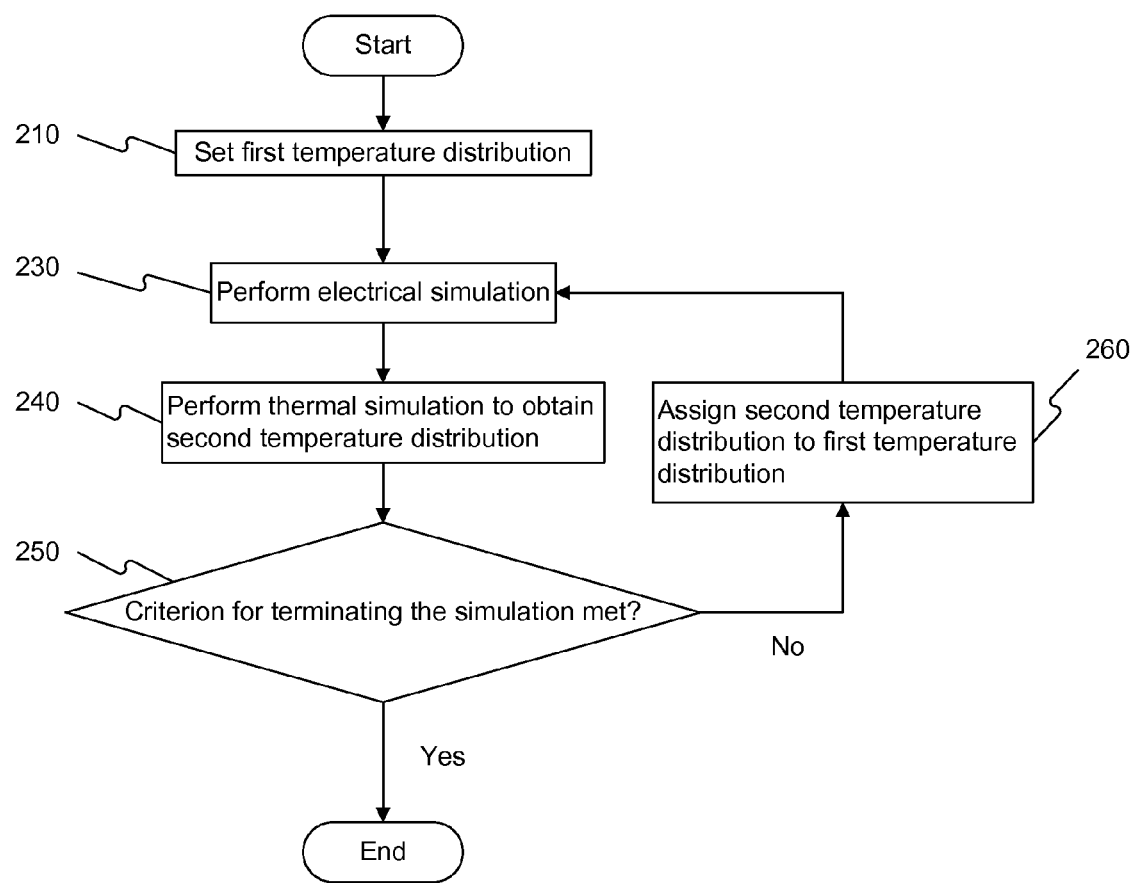
FIG. 2 is a flow chart showing a method for simulating a temperature distribution in an electrical circuit according to an exemplary embodiment of the present disclosure.

FIG. 2 is a flow chart showing the method for electrical-thermal co-simulation on an electrical circuit, such as the electrical circuit 120 formed in the electric package 100 shown in FIGS. 1(a) and 1(b), according to an exemplary embodiment of the present disclosure.

At step 210, a first temperature distribution in the electrical circuit is set. As discussed above, a plurality of points on the electrical circuit may be selected for performing the simulations. Thus, setting the first temperature distribution may include setting a first temperature for each of the plurality of points. In some embodiments, the first temperature distribution may be a uniform distribution such that the temperature for each of the plurality of points may be the same. For example, the first temperature distribution may be set as a uniform temperature distribution that the first temperature for each of the plurality of points equals to an environment temperature, such as room temperature. For another example, the first temperature may be a temperature of an environment in which the circuit normally or is designed to operate. For a further example, the first temperature may be a temperature measured by a user at a certain point of a circuit board to be simulated. In some embodiments, the first temperature distribution may be a non-uniform distribution such that the temperature may be different for at least some of the plurality of points. In this example, setting the first temperature distribution may include setting a different first temperature for one or more of the plurality of points.

A simulation iteration is performed to obtain the simulated temperature distribution in the electrical circuit. The iteration includes an electrical simulation and a thermal simulation.

At step 230, the electrical simulation is performed across the electrical circuit, taking into consideration the first temperature distribution. For example, the temperature may affect the conductivity of the electrical traces or other conductors/components, and that, in turn, may affect currents within and voltages drops across the electrical traces or other conductors/components. The electrical simulation may take into consideration the impact of the temperature distribution. That may involve calculating values of electrical properties of the components on the circuit based on the first temperature distribution. Most of the normal values of electrical properties of a component are set to be the values at a standard temperature (e.g., 20° C.). If the first temperature distribution is set to be the standard temperature, the electrical simulation may be based on the normal values provided by the supplier, and the calculation may not be necessary. In this situation, the electrical simulation inherently takes into consideration the first temperature distribution. A user may also choose to set the first temperature distribution different from the standard temperature. In the electrical simulation, if the difference between the first temperature distribution and the standard temperature is small (and thereby the impact on electrical properties by the temperature difference is small), the user may choose to ignore the impact caused by the difference between the two temperatures, and conduct the electrical simulation based on the values of electrical properties at the standard temperature. The results of the electrical simulation may include an electric current density distribution and an electric potential distribution. The electric current density distribution may include an electric current density for each of the plurality of points, and the electric potential distribution may include an electric potential for each of the plurality of points.

At step 240, the thermal simulation is performed across the electrical circuit, taking into consideration the results of the electrical simulation. The thermal simulation provides a second temperature distribution, which may include a second temperature for each of the plurality of points.

Various heating sources may exist in the electrical circuit, including, for example, the current flowing through the components, such as die 102, of the electrical circuit and the current flowing through the traces 104, vias 106, or solder bumps 108. The former is called component heating and the latter is called Joule heating. The component heating may include a heating due to dynamic currents inside the components and a heating due to a leakage power inside the components. The dynamic currents may be set by the user. The leakage power is temperature dependent and increases with increasing temperature. The model describing the dynamic currents and leakage power may be provided by the supplier of the component.

At step 250, a criterion for determining whether to terminate the simulation is checked. If the criterion is met, the second temperature distribution is considered to be the simulated temperature distribution in the electrical circuit, and the simulation is terminated. However, if the determination result at step 250 is "no," the second temperature distribution is assigned to the first temperature distribution (step 260), and the simulation flow goes back to step 230. Such an iteration is repeated until the criterion is met.

Figure 3:
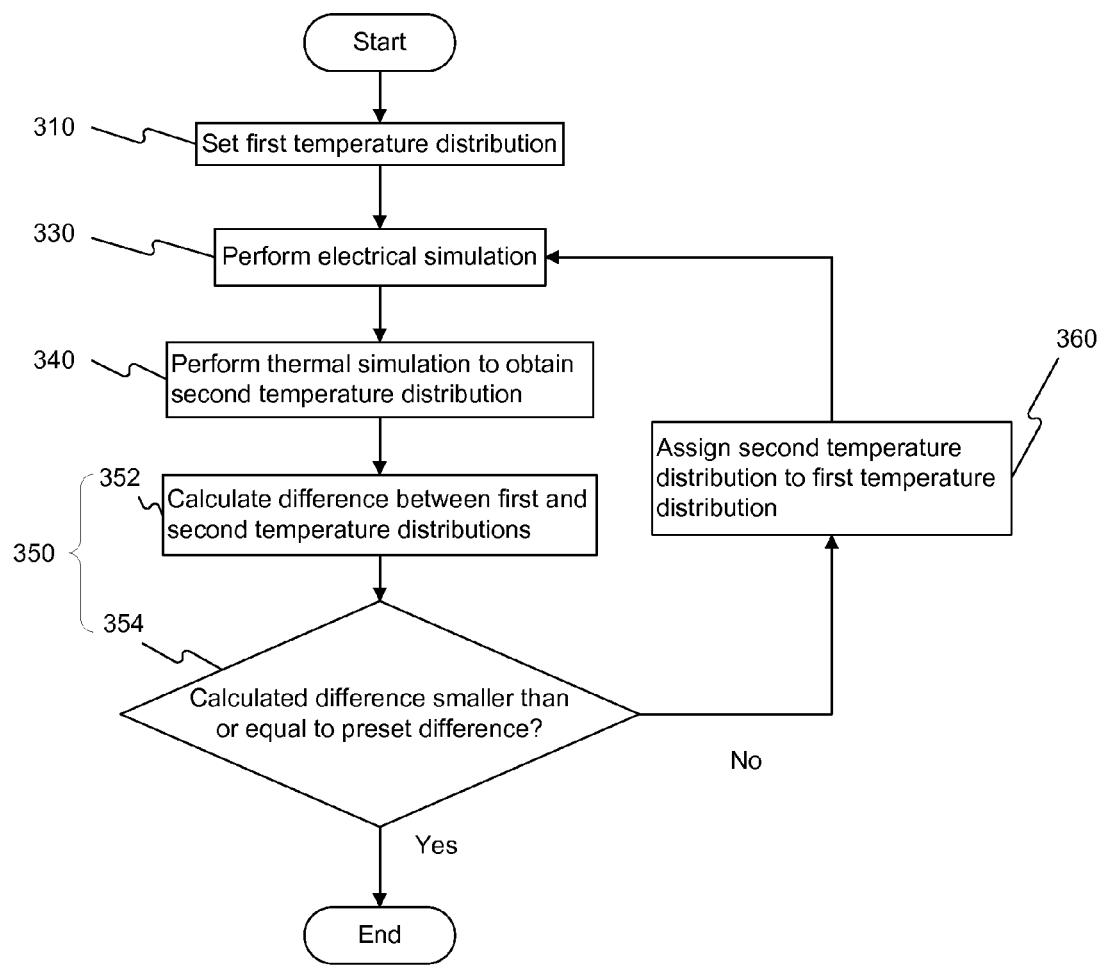
FIG. 3 is a flow chart showing a method for simulating a temperature distribution in an electrical circuit according to another exemplary embodiment of the present disclosure.

The method shown in FIG. 2 is an exemplary embodiment of the present disclosure. The method flow consistent with embodiments of the present disclosure may be different under different circumstances, for example, when the criterion for terminating the simulation is different. FIG. 3 shows an exemplary embodiment of the present disclosure, where temperature distribution is used as the criterion for terminating the simulation. Steps 310, 330, 340, and 360 are the same as steps 210, 230, 240, and 260 in FIG. 2, and thus they are not described.

As shown in FIG. 3, the criterion check step 350 includes two steps 352 and 354. At step 352, a difference between the first temperature distribution and the second temperature distribution is calculated. At step 354, this calculated difference is compared with a preset difference. If the calculated difference is smaller than or equal to the preset difference, it is determined that the criterion for terminating the simulation is met and the simulation is terminated. If the calculated difference is larger than the preset difference, it is determined that the criterion for terminating the simulation is not met and the flow goes to step 360. Afterward, the flow goes back to step 330. Such an iteration is repeated until the calculated difference is smaller than or equal to the preset difference.

As discussed above, when performing the simulations, a plurality of points on the electrical circuit may be selected, and a first temperature and a second temperature may be set or calculated for each of the plurality of points. Thus, in some embodiments, calculating the difference between the first temperature distribution and the second temperature distribution may include calculating a temperature difference between the first temperature and the second temperature for each of the plurality of points. Comparing the calculated difference with the preset difference to determine whether the criterion is met may include comparing the calculated temperature difference for each of the plurality of points with a preset temperature difference. In these embodiments, if the calculated temperature difference for each of the plurality of points is smaller than or equal to the preset temperature difference, it is determined that the criterion for terminating the simulation is met. If the calculated temperature difference for at least one of the plurality of points is larger than the preset temperature difference, it is determined that the criterion is not met.

In some embodiments, calculating the difference between the first temperature distribution and the second temperature distribution may include calculating a difference distribution across the circuit between the first temperature distribution and the second temperature distribution, and determining a largest difference of the difference distribution as the difference between the first and second temperature distributions. Comparing the calculated difference with the preset difference may include comparing the largest difference with the preset difference. If, for example, the largest difference is smaller than or equal to the preset difference, it is determined that the criterion for terminating the simulation is met. If, for example, the largest difference is larger than the preset difference, it is determined that the criterion for terminating the simulation is not met.

Other characteristics, such as electrical properties of the electrical circuit, may also be used as the criterion for terminating the simulation. In some embodiments, the electrical property used as the criterion may be distributional across the electrical circuit. For example, the electrical property may be an electric current density distribution or an electric potential distribution. In some embodiments, the electrical property used as the criterion may be a property with respect to the entire electrical circuit, such as, for example, a total power consumption of the electrical circuit.

Figure 4:
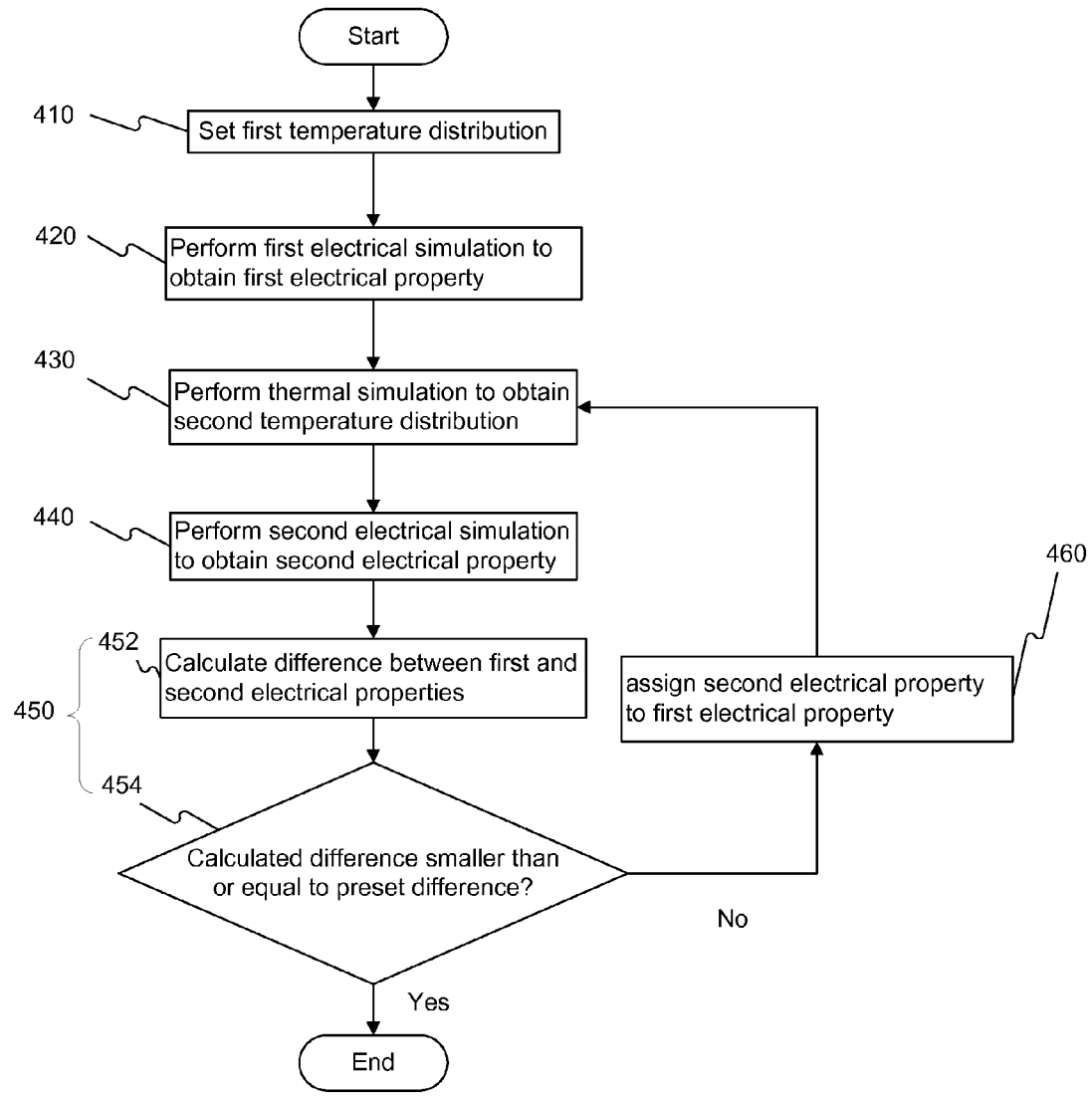
FIG. 4 is a flow chart showing a method for simulating a temperature distribution in an electrical circuit according to still another exemplary embodiment of the present disclosure.

FIG. 4 is a flow chart showing an exemplary embodiment consistent with the present disclosure using an electrical property of the electrical circuit as the criterion for terminating the simulation.

Consistent with embodiments of the present disclosure, the electrical property, such as the electric current density distribution or the electric potential distribution, is calculated by the electrical simulation. In the exemplary embodiment shown in FIG. 4, a first temperature distribution is set in step 410. A first electrical simulation is performed before the iteration starts. As shown in FIG. 4, a first electrical simulation across the electrical circuit is performed to obtain a first electrical property (step 420). The first electrical simulation may take into consideration the first temperature distribution.

At step 430 of FIG. 4, a thermal simulation is performed to obtain a second temperature distribution. The thermal simulation in step 430 takes into consideration the result of the first electrical simulation, including, for example, an electric current density distribution and/or an electric potential distribution. Then, a second electrical simulation is performed to obtain a second electrical property (step 440). The second electrical simulation in step 440 takes into consideration the second temperature distribution. After the second electrical property is obtained, a criterion is checked to determine whether the simulation should be terminated. As shown in FIG. 4, the criterion check step 450 includes two steps 452 and 454. At step 452, a difference between the first electrical property and the second electrical property is calculated. At step 454, this calculated difference is compared with a preset difference. If the calculated difference is smaller than or equal to the preset difference, it is determined that the criterion for terminating the simulation is met and the simulation is terminated. If the calculated difference is larger than the preset difference, it is determined that the criterion for terminating the simulation is not met and the flow goes to step 460. At step 460, the second electrical property is assigned to the first electrical property. The flow then goes back to step 430. Such an iteration is repeated until the calculated difference is smaller than or equal to the preset difference.

In some embodiments, the electrical property may be distributional across the electrical circuit, such as the electric current density distribution or the electric potential distribution as noted above. In these embodiments, performing the first electrical simulation to obtain the first electrical property may include performing the first electrical simulation to obtain a first value of the electrical property for each of the plurality of points. Similarly, performing the second electrical simulation to obtain the second electrical property may include performing the electrical simulation to obtain a second value of the electrical property for each of the plurality of points.

In some embodiments, calculating the difference between the first electrical property and the second electrical property may include calculating a value difference between the first value of the electrical property and the second value of the electrical property for each of the plurality of points. Comparing the calculated difference with the preset difference to determine whether the criterion is met may include comparing the calculated value difference for each of the plurality of points with a preset value difference. In these embodiments, if the calculated value difference for each of the plurality of points is smaller than or equal to the preset value difference, it is determined that the criterion for terminating the simulation is met. If the calculated value difference for at least one of the plurality of points is larger than the preset value difference, it is determined that the criterion is not met.

In some embodiments, the electrical property may be a total power consumption of the electrical circuit. In these embodiments, performing the first electrical simulation to obtain the first electrical property may include performing the first electrical simulation to obtain a first total power consumption. Similarly, performing the second electrical simulation to obtain the second electrical property may include performing the second electrical simulation to obtain a second total power consumption. The total power consumption may be calculated from the electric current density distribution and the electric potential distribution.

In these embodiments described in the preceding paragraph, calculating the difference between the first electrical property and the second electrical property may include calculating a power difference between the first total power consumption and the second total power consumption. Comparing the calculated difference with the preset difference to determine whether the criterion is met may include comparing the calculated power difference with a preset power difference. In these embodiments, if the calculated power difference is smaller than or equal to the preset power difference, it is determined that the criterion for terminating the simulation is met. If the calculated power difference is larger than the preset power difference, it is determined that the criterion is not met.

In some of the embodiments discussed above, each of the plurality of points may be checked to determine whether the criterion is met. For example, the temperature, the electric current density, or the electric potential for each of the plurality of points is checked. However, it may not be necessary to check all of the plurality of points. In some embodiments of the present disclosure, one or more important points may be checked to determine whether the criterion for terminating the simulation is met. The process to determine whether the criterion for terminating the simulation is met in these embodiments is basically similar to that described in the preceding paragraphs with respect to the situations in which each of the plurality of points is checked. The difference between the two approaches is that in the former approach, comparing the calculated difference with the preset difference is performed for the one or more important points, rather than all of the plurality of points.

In the exemplary embodiments shown in FIGS. 3 and 4, when the calculated difference is smaller than or equal to the preset difference, it is determined that the criterion is met (see step 354 in FIG. 3 and step 454 in FIG. 4). However, the criterion may also be set in a different manner. For example, the criterion may be set in a manner that the criterion is met only when the calculated difference is smaller than the preset difference. If the calculated difference is equal to or larger than the preset difference, it is determined that the criterion is not met.

Consistent with embodiments of the present disclosure, the electrical circuit may include a plurality of layers stacked on top of each other. For example, the electrical circuit 120 shown in FIG. 1(*b*) may include a layer above the dielectric substrate 110 and a layer beneath the dielectric substrate 110. The electrical and thermal simulations may be performed on each of the plurality of layers separately.

Consistent with embodiments of the present disclosure, the electrical circuit may include a plurality of traces, vias, and solder bumps, such as the traces 104, vias 106, and solder bumps 108 shown in FIGS. 1(*a*) and 1(*b*). The electrical and thermal simulations may be performed on part of the electrical circuit including some of the plurality of traces, via, and solder bumps separately.

Figure 5:
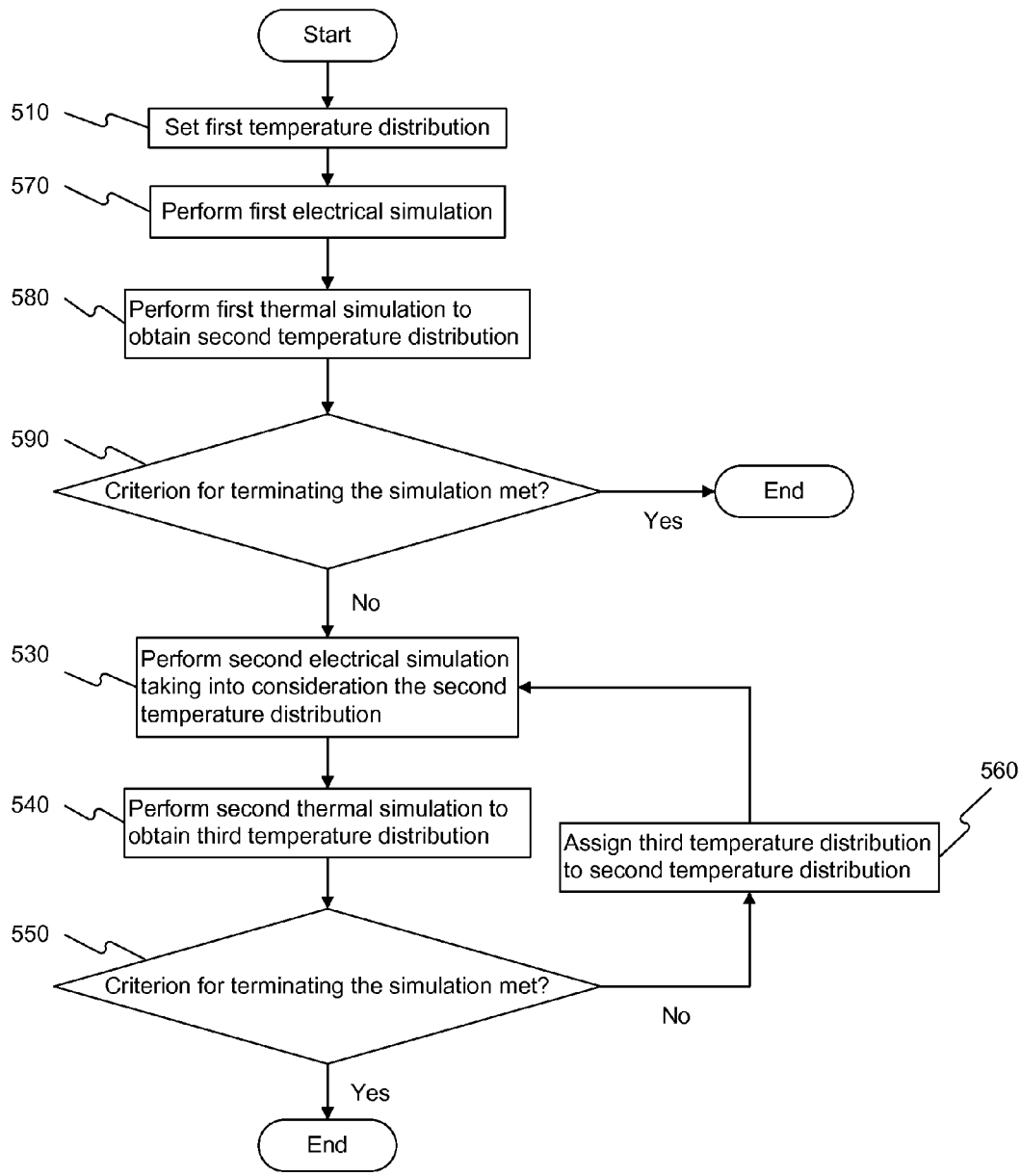
FIG. 5 is a flow chart showing a method for simulating a temperature distribution in an electrical circuit according to a further exemplary embodiment of the present disclosure.

FIG. 5 shows another embodiment of the present disclosure. As shown in FIG. 5, the method includes (a) setting a first temperature distribution in the electrical circuit (step 510), (b) performing a first electrical simulation across the electrical circuit (step 570), (c) performing a first thermal simulation across the electrical circuit to obtain a second temperature distribution, taking into consideration a result of the first electrical simulation (step 580), and (d) determining whether a criterion for terminating the simulation is met (step 590). If the criterion is met, terminate the simulation. If the criterion is not met, the method further includes (f1) performing a second electrical simulation across the electrical circuit, taking into consideration the second temperature distribution (step 530), (f2) performing a second thermal simulation across the electrical circuit to obtain a third temperature distribution, taking into consideration a result of the second electrical simulation in (f1) (step 540), and (f3) determining whether the criterion for terminating the simulation is met (step 550). If the criterion is met, terminate the simulation. If the criterion is not met, assign the third temperature distribution to the second temperature distribution (step 560), and repeat steps (f1), (f2), and (f3). In (b) (step 570), the electrical simulation may be performed based on normal values of the electrical property of the components on the circuit, without considering the impact of the first temperature distribution. For example, the normal resistance value of a trace may be set when the trace is at a normal room temperature (e.g., at 20° C.), and the electrical simulation in (b) may be performed based on that normal resistance value, notwithstanding that the first temperature distribution may be different from 20° C. In some embodiments, a user may assign the first temperature distribution to be the normal room temperature or a slightly different temperature.

Consistent with embodiments of the present disclosure, a computer is provided which is able to carry out the methods for simulating the electrical circuit consistent with embodiments of the present disclosure. The computer may be, for example, a personal computer, a workstation, a parallel computer, or a super computer. The computer may comprise one or more input devices, such as a keyboard, a mouse, or a control panel, for receiving user instructions or user-set parameters. The computer may also comprise one or more output devices, such as a display or a printer. The display may be used to present an interface for the user to, for example, input values of parameters. The simulation results, for example, temperature distribution and/or electrical properties may also be output to, and displayed on, the display.

Consistent with embodiments of the present disclosure, one or more non-transitory storage medium storing a computer program are provided. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be a semiconductor storage medium, such as DRAM, SRAM, EPROM, EEPROM, flash memory, or memory stick.

Other embodiments of the present disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for simulating an electrical circuit, the method comprising:
   (a) selecting a plurality of points in the electrical circuit;
   (b) setting a first temperature distribution in the electrical circuit by setting a first temperature for each of the plurality of points;
   (c) performing an electrical simulation across the electrical circuit taking into consideration the first temperature distribution;
   (d) performing a thermal simulation across the electrical circuit taking into consideration a result of the electrical simulation, to obtain a second temperature distribution that includes performing a thermal simulation to obtain a second temperature for each of the plurality of points;
   (e) determining whether a criterion based on temperature distributions is met, and if the criterion is met, terminating the simulation irrespective of the result of the electrical simulation; if the criterion is not met, assigning the second temperature distribution to the first temperature distribution, and repeating steps (c), (d) and (e);
   (f) wherein the determining whether the criterion based on temperature distributions is met includes:
   calculating a temperature difference between the first temperature and the second temperature for each of the plurality of points; and
   comparing the temperature difference for each of the plurality of points with a preset difference,
      if the temperature difference for each of the plurality of points is smaller than or equal to the preset difference, it is determined that the criterion is met; and
      if the temperature difference for at least one of the plurality of points is larger than the preset difference, it is determined that the criterion is not met.

2. The method of claim 1, wherein the setting the first temperature distribution includes setting a uniform first temperature for each of the plurality of points the circuit.

3. The method of claim 2, wherein the setting the uniform first temperature for each of the plurality of points includes setting a uniform first temperature of room temperature for each of the plurality of points across the circuit.

4. The method of claim 2, wherein the setting the uniform first temperature for each of the plurality of points includes setting a uniform first temperature of a normal operating temperature of the circuit for each of the plurality of points.

5. The method of claim 1, wherein the setting the first temperature distribution includes setting a non-uniform first temperature for each of the plurality of points.

6. The method of claim 1, wherein the performing the thermal simulation across the electrical circuit to obtain the second temperature distribution taking into consideration the result of the electrical simulation includes performing the thermal simulation taking into consideration at least one of an electric current density distribution or an electric potential distribution in the electrical circuit obtained by the electrical simulation.

7. The method of claim 6, wherein performing the thermal simulation across the electrical circuit includes performing the thermal simulation taking into consideration a component heating generated by a component in the electrical circuit and a Joule heating generated by electric currents in the electrical circuit.

8. The method of claim 7, wherein the component heating includes a heating due to dynamic currents inside the components and a heating due to a leakage power inside the components.

9. The method of claim 1,
   wherein the electrical circuit is part of a printed-circuit-board (PCB), and
   wherein performing the thermal simulation across the electrical circuit includes performing the thermal simulation across the PCB.

10. The method of claim 1,
    wherein the electrical circuit is part of an electrical package, and
    wherein performing the thermal simulation across the electrical circuit includes performing the thermal simulation across the electrical package.

11. The method of claim 1,
    wherein the electrical circuit comprises vias, solder bumps, and traces,
    wherein performing the electrical simulation across the electrical circuit includes performing the electrical simulation on each of the vias, solder bumps, and traces separately, and
    wherein performing the thermal simulation across the electrical circuit includes performing the thermal simulation on each of the vias, solder bumps, and traces separately.

12. The method of claim 1,
    wherein the electrical circuit comprises a plurality of layers,
    wherein performing the electrical simulation across the electrical circuit includes performing the electrical simulation on each of the plurality of layers separately, and
    wherein performing the thermal simulation across the electrical circuit includes performing the thermal simulation on each of the plurality of layers separately.

13. A computer-implemented method for simulating an electrical circuit, the method comprising:
(a) selecting a plurality of points in the electrical circuit;
(b) setting a first temperature distribution in the electrical circuit by setting a first temperature for each of the plurality of points;
(c) performing a first electrical simulation across the electrical circuit taking into consideration the first temperature distribution, to obtain a first electrical property that includes performing the first electrical simulation to obtain a first value of the electrical property for each of the plurality of points;
(d) performing a thermal simulation across the electrical circuit taking into consideration the first electrical property, to obtain a second temperature distribution that includes performing a thermal simulation to obtain a second temperature for each of the plurality of points;
(e) performing a second electrical simulation across the electrical circuit taking into consideration the second temperature distribution, to obtain a second electrical property that includes performing the second electrical simulation to obtain a second value of the electrical property for each of the plurality of points;
(f) determining whether a criterion based on electrical properties is met, and if the criterion is met, terminating the simulation irrespective of the result of the thermal simulation; if the criterion is not met, assigning the second electrical property to the first electrical property, and repeating steps (d), (e) and (f);
(g) wherein the determining whether the criterion based on electrical properties is met includes:
calculating a value difference between the first value of the electrical property and the second value of the electrical property for each of the plurality of points; and
comparing the value difference for each of the plurality of points with a preset difference,
if the value difference for each of the plurality of points is smaller than or equal to the preset difference, it is determined that the criterion is met; and
if the value difference for at least one of the plurality of points is larger than the preset difference, it is determined that the criterion is not met.

14. The method of claim 13, wherein the electrical property is an electric current density.

15. The method of claim 13, wherein the electrical property is an electric potential.

16. The method of claim 13,
wherein the performing the first electrical simulation to obtain the first electrical property includes performing the first electrical simulation to obtain a first total power consumption across each of the plurality of points,
wherein the performing the second electrical simulation to obtain the second electrical property includes performing the second electrical simulation to obtain a second total power consumption across each of the plurality of points,
wherein the calculating the value difference between the first value of the electrical property and the second value of the electrical property includes calculating a power difference between the first total power consumption and the second total power consumption, and
wherein the comparing the value difference for each of the plurality of points with the preset difference to determine whether the criterion is met includes comparing the power difference with a preset power difference,
if the power difference is smaller than or equal to the preset power difference, it is determined that the criterion is met; and
if the power difference is larger than the preset power difference, it is determined that the criterion is not met.

17. A computer-readable non-transitory storage medium storing a computer program, the computer program, when executed, instructing a computer to:
(a) select a plurality of points in the electrical circuit;
(b) set a first temperature distribution in the electrical circuit by setting a first temperature for each of the plurality of points;
(c) perform an electrical simulation across the electrical circuit taking into consideration the first temperature distribution;
(d) perform a thermal simulation across the electrical circuit taking into consideration a result of the electrical simulation, to obtain a second temperature distribution that includes performing a thermal simulation to obtain a second temperature for each of the plurality of points;
(e) determine whether a criterion based on temperature distributions is met, and if the criterion is met, terminate the simulation irrespective of the result of the electrical simulation; if the criterion is not met, assign the second temperature distribution to the first temperature distribution, and repeat steps (c), (d) and (e);
(f) wherein the computer program instructing the computer to determine whether the criterion based on temperature distributions is met includes the computer program instructing the computer to:
calculate a temperature difference between the first temperature and the second temperature for each of the plurality of points; and
compare the temperature difference for each of the plurality of points with a preset difference,
if the temperature difference for each of the plurality of points is smaller than or equal to the preset difference, it is determined that the criterion is met; and
if the temperature difference for at least one of the plurality of points is larger than the preset difference, it is determined that the criterion is not met.

18. The storage medium of claim 17, wherein the computer program instructing the computer to set the first temperature distribution includes the computer program instructing the computer to set a uniform first temperature for each of the plurality of points across the circuit.

19. The storage medium of claim 18, wherein the computer program instructing the computer to set the uniform first temperature for each of the plurality of points includes the computer program instructing the computer to set a uniform first temperature of room temperature for each of the plurality of points across the circuit.

20. The storage medium of claim 18, wherein the computer program instructing the computer to set the uniform first temperature for each of the plurality of points includes the computer program instructing the computer to set a uniform first temperature of a normal operating temperature of the circuit for each of the plurality of points.

21. The storage medium of claim 17, wherein the computer program instructing the computer to set the first temperature distribution includes the computer program instructing the computer to set a non-uniform first temperature for each of the plurality of points.

22. A computer-implemented method for simulating an electrical circuit, the method comprising:
(a) selecting a plurality of points in the electrical circuit;

(b) setting a first temperature distribution in the electrical by setting a first temperature for each of the plurality of points;

(c) performing an electrical simulation across the electrical circuit;

(d) performing a first thermal simulation across the electrical circuit taking into consideration a result of the first electrical simulation, to obtain a second temperature distribution that includes performing a thermal simulation to obtain a second temperature for each of the plurality of points; and (e) determining whether a criterion based on temperature distributions is met, and:

(f) if the criterion is met, terminating the simulation irrespective of the result of the first electrical simulation;

(g) if the criterion is not met,
 (g1) performing a second electrical simulation across the electrical circuit, taking into consideration the second temperature distribution,
 (g2) performing a second thermal simulation across the electrical circuit taking into consideration a result of the second electrical simulation in step (g1), to obtain a third temperature distribution that includes performing a thermal simulation to obtain a third temperature for each of the plurality of points, and
 (g3) determining whether the criterion based on temperature distributions is met, and if the criterion is met, terminating the simulation irrespective of the result of the second electrical simulation; if the criterion is not met, assigning the third temperature distribution to the second temperature distribution, and repeating steps (g1), (g2), and (g3);

(h) wherein said (g3) includes:
calculating a temperature difference between the second temperature and the third temperature for each of the plurality of points; and
comparing the temperature difference for each of the plurality of points with a preset difference,
 if the temperature difference for each of the plurality of points is smaller than or equal to the preset difference, it is determined that the criterion is met; and
 if the temperature difference for at least one of the plurality of points is larger than the preset difference, it is determined that the criterion is not met.

23. The method of claim 22, wherein the setting the first temperature distribution includes setting a uniform first temperature distribution across the circuit.

24. The method of claim 23, wherein the setting the uniform first temperature distribution includes setting a uniform first temperature distribution of room temperature across the circuit.

25. The method of claim 23, wherein the setting the uniform first temperature distribution includes setting a uniform first temperature distribution of a normal operating temperature of the circuit.

26. The method of claim 22, wherein the setting the first temperature distribution includes setting a non-uniform first temperature distribution.

* * * * *

UNITED STATES PATENT AND TRADEMARK OFFICE
CERTIFICATE OF CORRECTION

PATENT NO. : 8,880,386 B2  
APPLICATION NO. : 13/158718  
DATED : November 4, 2014  
INVENTOR(S) : An-Yu Kuo and Xin Al Page 1 of 1

It is certified that error appears in the above-identified patent and that said Letters Patent is hereby corrected as shown below:

In the Claims

Col. 10, line 6, after "points", insert --across--.

Signed and Sealed this  
Seventeenth Day of February, 2015

Michelle K. Lee  
*Deputy Director of the United States Patent and Trademark Office*